United States Patent [19]
Piascik

[11] Patent Number: 5,845,552
[45] Date of Patent: Dec. 8, 1998

[54] TOOL AND METHOD FOR REMOVAL OF AN OIL FILTER CARTRIDGE CAP FROM MARINE AND AUTOMOTIVE ENGINES

[76] Inventor: Jerome Paul Phillip Piascik, 13306 Thraves Rd., Garfield Heights, Ohio 44125-4442

[21] Appl. No.: 808,173

[22] Filed: Feb. 28, 1997

[51] Int. Cl.$^6$ ................................................... B25B 23/00
[52] U.S. Cl. ............................................ 81/461; 81/176.15
[58] Field of Search ................................ 81/461, 176.1, 81/176.15, 176.2, 180.1, 185.1

[56] References Cited

U.S. PATENT DOCUMENTS

| | | | |
|---|---|---|---|
| 3,043,171 | 7/1962 | Lederer | 81/176.15 |
| 4,237,755 | 12/1980 | Gunnell, III | 81/176.15 |
| 4,374,453 | 2/1983 | Rodriguez | 81/176.15 X |
| 4,664,000 | 5/1987 | Bainbridge | 81/176.15 X |
| 4,967,614 | 11/1990 | Van Horssen | 81/176.15 |
| 4,982,629 | 1/1991 | German | 81/176.1 |
| 5,154,102 | 10/1992 | Becker | 81/176.15 X |
| 5,214,985 | 6/1993 | Rinehart | 81/176.15 |

*Primary Examiner*—D. S. Meislin
*Attorney, Agent, or Firm*—Donald A. Bergquist

[57] ABSTRACT

A tool for removing an oil filter cartridge cap threadably attached to an engine has pins for engaging oil passage holes in the cartridge cap after the filter cartridge housing is partly removed to remove the filter cartridge, thereby exposing the cartridge cap. The tool includes a drive disk adapted to be engaged by a wrench and an interchangeable base disk to be engaged by the drive disk and having the aforesaid pins for engaging the oil passage holes. Plural base disks are provided to match filters having different hole patterns. A central hole in each disk provides clearance for the threaded nipple by which the oil filter cartridge cap is threadably attached to the engine.

5 Claims, 1 Drawing Sheet

TOOL AND METHOD FOR REMOVAL OF AN OIL FILTER CARTRIDGE CAP FROM MARINE AND AUTOMOTIVE ENGINES

BACKGROUND OF THE INVENTION

This tool is improved over existing tools to remove a damaged or stuck oil filter cap. The outer thin metal housing of the oil filter must be removed to expose the oil filter cap to allow the insertion of the base drive and an appropriate base disk. The base drive has permanent metal pins for attaching the base disk which provides for stronger and more secure means to remove the stuck oil filter cap. The pins in the base disk are arranged so as to match specific oil passage holes in the now exposed oil filter cap. There are four standard interchangeable base disks in the best mode of this invention to accommodate manufacturers of specific oil filters. The appropriate base disk is attached to the base drive and is inserted into the cartridge arranged so the pins on the base disk match the oil passage holes on the oil filter cap, thus locking the device into place. The base drive and base disks have openings in the center to accommodate a ratchet type or other socket drive device with or without an extension and can accommodate various combinations of such drivers.

A typical oil filter is screwed onto the engine block by means of a threaded hollow nipple on the underside of the engine so the oil may pass through the filter via oil pump feed. The oil filter cap is made of metal and has a central opening to receive the threaded nipple. Smaller oil passage holes surround the central opening for oil to pass through.

A difficulty with oil filters is that they may be put on too tight or be damaged due to accidents, therefore necessitating other than conventional means to remove them. This difficulty was addressed by an Albert H. Lederer, whose U.S. Pat. No. is 3,043,171 dated Jul. 10, 1962. This device is circular with spikes protruding from it and is hammered into place. A wrench is inserted into the central opening allowing the device to be turned for removal. A problem arose because the spikes have a tendency to shear and tear the thin metal wall of the oil filter cartridge without removal of the cartridge cap.

In addition to the Lederer device, another tool was patented Jan. 8, 1991: U.S. Pat. No. 4,982,629 by Ronald T. Germain. This tool uses a single round metal disk with multiple holes for insertion of roll pins. It also has a central opening so a wrench may be inserted for loosening the cartridge cap. Problems with such a device is that there are only two roll pins to receive the full torque of the wrench which could bend or shear the pins. These pins are also removable and with use the pins could become loose and fall out of the device. In addition, the central opening of the device has to accommodate the hollow threaded nipple from the engine block as well as the shank of a wrench potentially leaving room for slippage of the wrench if not inserted to a correct depth in the central opening.

SUMMARY OF THE INVENTION

This invention is an improvement over existing tools and methods for removing an oil filter cartridge cap from marine and automobile engines domestic and foreign. The base drive and base disk are made of solid machined steel. The base drive has two (2) permanent pins attached for the base disk to lock onto. The base drive and base disk are circular and the base drive may have a round opening in the center with a tapered recessed indentation which takes the form of a square opening to accommodate a ratchet type or other socket drive wrench. After the appropriate base disk is selected and placed on the base drive, the ratchet or wrench can be inserted into the bottom of the base drive. The entire device can now be inserted into the oil filter cartridge cap aligning the pin on the base disk with the oil passage holes. The ratchet or wrench can now be turned counter-clockwise to remove the stuck oil filter cap.

BRIEF DESCRIPTION OF THE DRAWINGS

FIG.: 1 shows a standard oil filter mounted onto an engine block.

FIG.: 2 shows a standard oil filter with a partially removed outer housing. The removed housing allows the base disk FIG. 4 and base drive apparatus FIG. 5 to be inserted for removal of the oil filter cap. The housing can be removed either closer or further away from the cap.

FIG.: 3 shows the bottom of the oil filter cap with the central opening surrounded by smaller oil passage holes.

Figure 5:
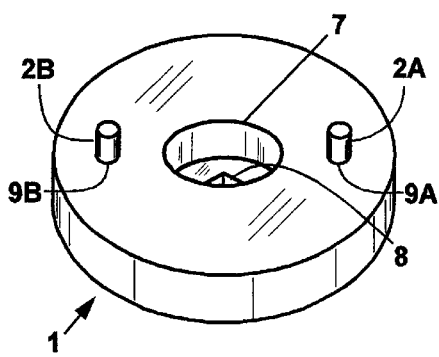

FIG.: 4 shows the base disk which is secured to the base drive FIG. 5 via holes 5A and SB and pins 2A and 2B FIG. 5.

FIG.: 5 shows the base drive to which the base disk attaches by means of permanently-attached pins.

FIG.: 6 shows a ratchet and a ratchet extension inserted into the bottom of the base drive. The base drive and base disk is shown to be inserted into the partially-removed oil filter.

DESCRIPTION OF THE PREFERRED EMBODIMENT

Figure 1:
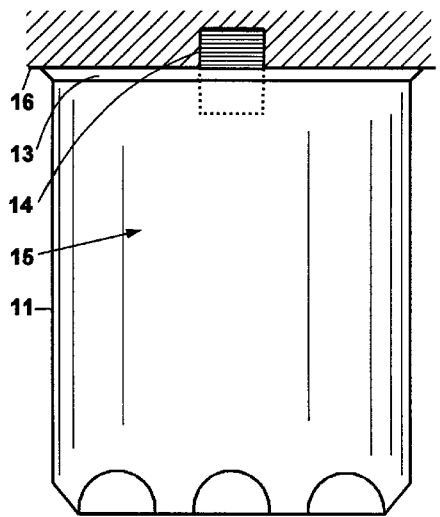

FIG. 1 shows a standard oil filter (15) attached to an engine block (16). The oil filter (15) is round and has a thin metal outside case and is enclosed except for one end which has a metal cap with holes (13) shown in FIG. 3.

Figure 2:
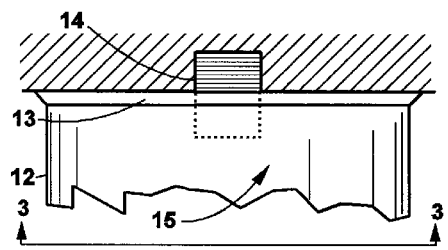

FIG. 2 shows the partially removed outer oil filter housing (12) still attached to the engine block (16).

Figure 3:
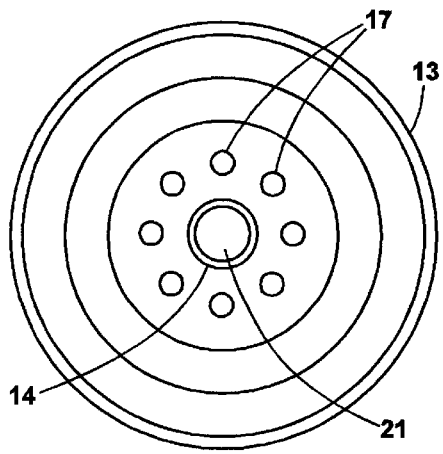

FIG. 3 shows the inside of the oil filter cap (13) As illustrated, the oil cap (13) has a central opening (21) in the cap (13) to receive the hollow threaded nipple (14) for attachment to the engine block (16) by turning the oil filter clockwise until secure. Also in FIG. 3 are smaller oil passage holes (17) arranged in a circular pattern around the central opening (21).

Figure 4:
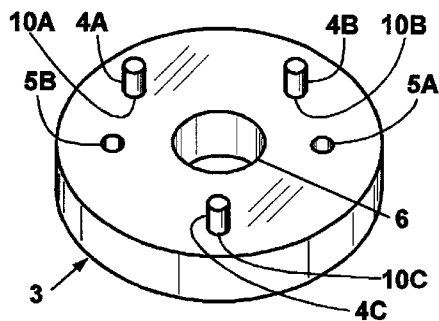

FIG. 4 is one of several standard interchangeable base disks (3), each of which is the approximate size of the oil filter cap (13) and has 2 holes 5A and 5B to receive the base drive locking pins 2A and 2B in FIG. 5. The base disk has a central opening (6) that provides clearance for the nipple (14). The base drive disk, shown in FIG. 5 also has a central opening (7) to similarly provide clearance for nipple (14).

Referring to FIG. 3, the oil passage holes (17) in the oil filter cap (13) are in a fixed circular arrangement dependent upon the manufacturer of the oil filter. The base drive (1) FIG. 5 of this tool is constant whereas the base disks (3) FIG. 4 are interchangeable. The pins on a specific base disk, FIG. 4. are permanent and will accommodate specific oil filters. Having interchangeable base disks will allow the user to accommodate a variety of oil filters without moving pins.

Figure 6:
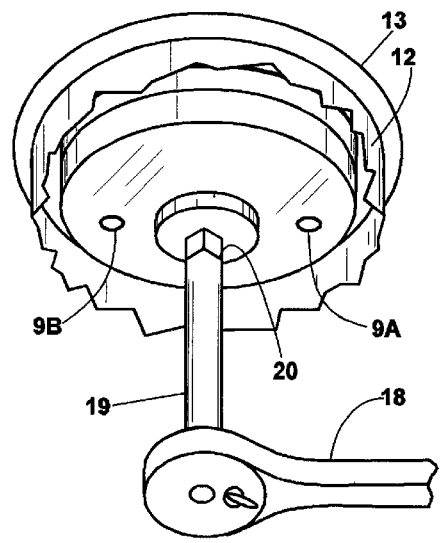

FIG. 6 shows the oil filter with its outer casing partly removed and the filter element housed therein removed. The base disk (3) is coupled with the base drive (1)and is inserted adjacent to the oil filter cap (13) with pins 4A, 4B and 4C inserted into the oil passage holes (17). The wrench or ratchet can be turned counter-clockwise for easy removal of the oil filter cap.

This tool is designed specifically for marine as well as automotive/truck engines domestic and foreign that use standard oil and gas filters. This device uses a two-piece multiple approach consisting of a base drive and base disks while others use a one-piece approach. Having central openings in each disk and drive allows for a deeper central opening to accommodate a deep or shallow socket or wrench as well as a longer threaded nipple at the same time. Whereas, with previous similar devices the central opening is too shallow at times to accommodate both various threaded nipple length, size and various wrench sizes. The previous tools could not be inserted fully adjacent to the oil filter cap because the threaded nipple which extends into the central opening could not accommodate the wrench socket fully causing slippage or the pins could not be fully inserted into the oil passage holes because the wrench was fully inserted therefore, not leaving enough room for the threaded nipple causing slippage.

This tool has permanent pin placement whereas previous tools have movable pins. Permanent pin placement allows for stronger placement into the oil filter holes with less risk of slippage, breakage or accidental removal of the pins in high torque situations. The higher torque situation usually occurs when the filter has been damaged.

Since this tool is a two-piece device, this allows for greater depth than previous devices. This allows the user not to have to remove the outer casing as close to the oil filter cap for the tool to be inserted. At times physical accessibility and light are limited.

This device utilizes multiple disk design with separate interchangeable disks that can accommodate various oil filters, automotive oil filters, marine canister gas filters and diesel oil filter hole patterns. The disks are easily interchangeable on the base drive instead of moving pins as was done on previous tools wherein the pins may break, get lost, or get stuck.

This tool may have a large round opening on the underside of the base drive for easier insertion of the ratchet wrench. The round opening, when present, is contiguous with and tapers into a square operative opening which accommodates a standard ratchet wrench. Since light and accessibility are sometimes limited, the ability to locate a larger central opening is easier to the user than trying to find an exact opening under limited physical conditions. This tool will facilitate removal of an oil filter in a boat or car that has limited working space.

LEGEND

1. Base Drive, FIG. 5
2. Base Disk Drive Pins 2A and 2B pressed into Base, FIG. 5
3. Base Disk (Pattern 1 of 4), FIG. 4
4. Cartridge Cap Removal Pins 4A, 4B and 4C, FIG. 4
5. Base Disk Pin Holes 5A and 5B for Base Drive Fins 2A and 2B, FIGS. 4 & 5
6. Circular Hole in Base Disk to receive Threaded Nipple, FIG. 4
7. Circular Hole in Base Drive to receive Threaded Nipple, FIG. 5
8. Square opening in Base Drive for Ratchet Wrench Tool, FIG. 5
9. Base Drive Pin Holes 9A and 9B, FIG. 5
10. Cartridge Cap Removal Pin Pattern Holes 10A, 10B and 10C with Pins 4A, 4B and 4C pressed in Base Disk, FIG. 4
11. Oil Filter Case, FIG. 1
12. Oil Filter Case partially removed, FIG. 2
13. Oil Filter Cartridge Cap, FIG. 1
14. Hollow Threaded Nipple, FIG. 1
15. Oil Filter mounted on Engine, FIG. 1
16. Engine Block, FIG. 1
17. Oil Passage Holes, FIG. 3
18. Ratchet Type Wrench, FIG. 6
19. Ratchet Wrench Extension inserted into Base drive, FIG. 6
20. Hole for Extension Shank in Base, FIG. 6
21. Central Opening in Cartridge Cap to receive Threaded Nipple, FIG. 3

I claim:

1. A tool for removing an oil filter cartridge cap from an engine, the cartridge cap adapted for attaching to said engine by a threaded nipple and having a plurality of spaced first holes arrayed around the circumference of a first circle having a first pre-determined radius, said circle concentric with said nipple, which tool comprises:

(a) a selected base disk of finite thickness, having a central axis, and having at least two spaced first pins secured to one face of the base disk and projecting from said base disk to extend away therefrom, said first pins terminating in free outer ends arrayed around the circumference of a second circle of said first pre-determined radius centered on said axis and adapted to engage said first holes, said base disk also having at least two spaced second holes in a second face of said base disk extending into the thickness of said disk, said second holes arrayed around the circumference of a third circle of a second radius centered on said axis;

(b) a drive disk having a finite thickness, having a central axis, and having at least two spaced second pins secured to one face of the drive disk and projecting from said drive disk to extend away therefrom, said second pins terminating in free outer ends arrayed around the circumference of a fourth circle of said second radius centered on said drive disk, said drive disk may be cooperatively coupled with said selected base disk by said second pins engaging said second holes, said drive disk also adapted to receive a wrench to forcibly rotate said drive disk;

wherein, in use, said selected base disk is coupled with said drive disk and thereby with said wrench engaging said drive disk, and said first pins are engaged with said first holes of said filter cartridge cap, thereby to transfer torque from said wrench through said coupled disks to said oil filter cartridge cap to unscrew the oil filter cartridge cap from the engine.

2. The tool described in claim 1 wherein said selected base disk is one of a plurality of disks interchangeable on said drive disk, each disk within said plurality of disks having said spaced first pins spaced differently from the spacing on every other base disk in said plurality.

3. The tool described in claim 1 wherein said drive disk is adapted to receive a square drive wrench.

4. The tool described in claim 1 wherein said selected base disk has an axial hole therethrough and of a size to accommodate the unimpeded entry of said threaded nipple.

5. The tool described in claim 1 wherein said drive disk has an axial hole in said first face thereof and extending into the thickness of said drive disk and of a size to accommodate the unimpeded entry of said threaded nipple.

\* \* \* \* \*